Feb. 6, 1923.
C. P. HASSELGREN.
FLYTRAP.
FILED MAY 31, 1921.
1,444,502.
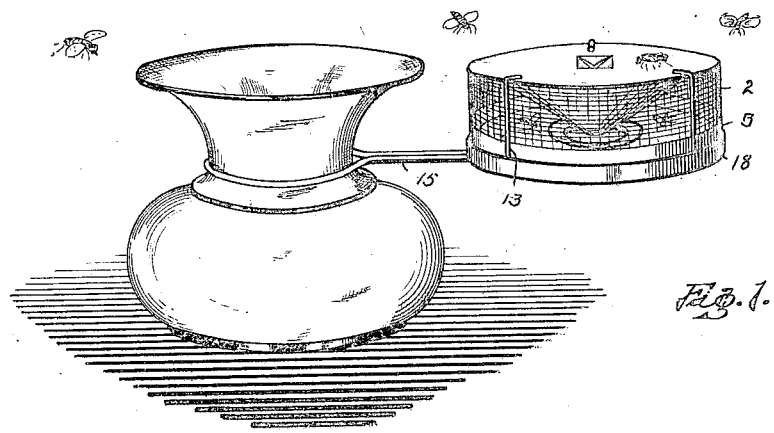
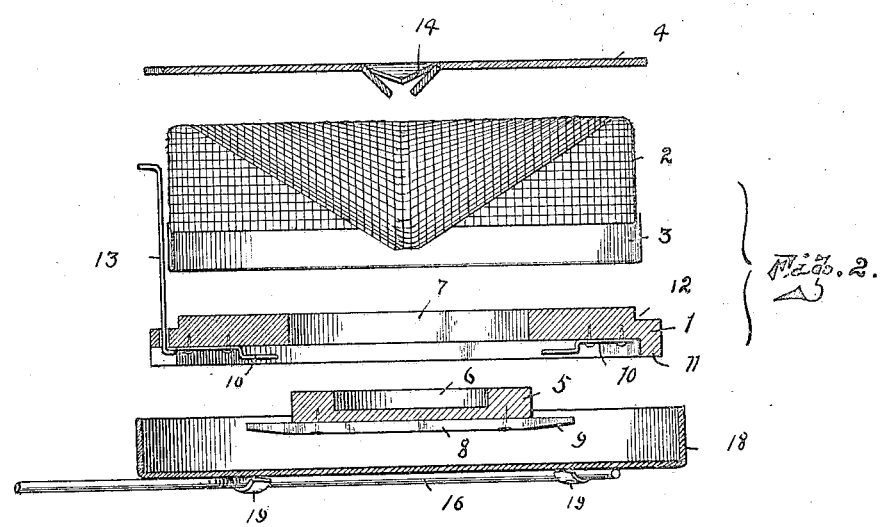
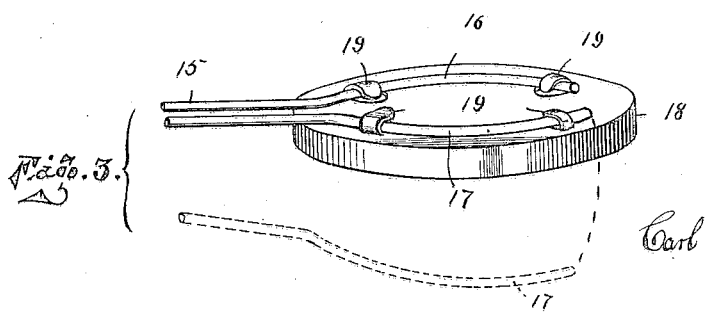
Inventor
Carl P. Hasselgren.
Theo Stevens.
Attorney Patented Feb. 6, 1923.

1,444,502

UNITED STATES PATENT OFFICE.

CARL P. HASSELGREN, OF DULUTH, MINNESOTA.

FLYTRAP.

Application filed May 31, 1921. Serial No. 473,589.

*To all whom it may concern:*

Be it known that I, CARL P. HASSELGREN, a citizen of the United States, residing at Duluth, in the county of St. Louis and State of Minnesota, have invented certain new and useful Improvements in Flytraps, of which the following is a specification, reference being had therein to the accompanying drawing.

This invention relates to fly traps and has for its principal object to provide a more efficient and sanitary trap than heretofore known.

Another object of the invention is to provide a trap which may be quickly and easily attached to a receptacle most frequented by flies, and one that may be quickly dismantled for cleaning purposes.

Still other objects and advantages of the peculiar construction will appear in the further description of the invention.

Referring now to the drawing accompanying this application and forming a part thereof:

Figure 1 is a perspective view of a cuspidor having one of my improved traps associated therewith;

Figure 2 is a vertical sectional view of the separated parts of the trap showing the relative cooperative attachments, and Figure 3 is a perspective view of the bottom of the trap holding pan used for supporting the trap adjacent a cuspidor.

The trap proper comprises four principal, separable parts: the circular base 1, which is preferably constructed of wood; the wire mesh body receptacle 2, it being reinforced about the bottom thereof by a thin metal band 3; the cover 4, which may be of heavy paper, wood or metal as desired, though the former is preferred; and the removable circular bait receptacle 5, which is insertable within the center of the base 1 and of a shape concentric therewith.

The bait receptacle 5 is preferably of wood, the same thickness as that of the principal base portion 1, and has formed therein the central recess or chamber 6 in which the bait, such as sugar, syrup, or the like, may be placed, when the receptacle may be placed from beneath, into the opening 7 for same, within the base 1. For holding the receptacle 5 in position I have provided a diametrically disposed transverse strip 8 fastened to the under side of the receptacle 5 and projecting upon opposite sides thereof as at 9. These projections are designed to fit intermediate of the under face of the base 1 and the metal clips 10 which are fastened to the base for such purpose. The engagement of the projections 9 of the strip 8 is accomplished by the turning of the receptacle by hand and it may thus be readily applied or removed as desired without separating the other parts of the trap. As a stable foundation for the trap I have shown the downwardly extending annular circumferential rim or flange 11.

An annular recess 12 is formed about the upper circumferential edge of the base 1 into which the metal band 3 of the receptacle 2 fits when the parts of the trap are assembled and when the cover 4 is applied, the wire holders 13, the lower bent ends of which fit through suitable holes through the recess 12, are turned so that their similarly bent upper ends overlap the edges of the cover, thus acting as a secure holding means for the parts of the body portion of the trap.

Within the cover 4 and centrally thereof is formed a rectangularly shaped depression or fly entrance and this is preferably done by making two diagonal intersecting cuts 14 therein and pressing the V-shaped extremities thus formed downwardly sufficiently for such entrance.

It is apparent that this form of trap may be used in any place desired and is an exceedingly convenient assemblage both as to cleanliness and congruous baiting.

When used in connection with a cuspidor or other receptacle about which flies are wont to congregate, I have devised a convenient means for supporting same in the way of a wire structure illustrated at 15, the ends of which are bent together forming a circular body portion for surrounding the receptacle and securely impinging the same, while the extreme ends are arched outwardly slightly, as at 16 and 17, for engagement with a metal pan like structure shown at 18. This pan has clips 19 secured to the bottom in which the end 16 of the wire holder are securely clinched, while the opposite two clips on the bottom of the pan may be left slightly open so that the end 17 of the holder may be conveniently slipped thereunder as clearly shown in Figure 3 of the drawing.

Thus I have provided a simple holding means for the trap which may be quickly applied or removed from a receptacle, such as a cuspidor or the like.

Having thus described my invention, what I claim and desire to secure by Letters Patent, is:

1. The combination with a fly lure, of a removable holder upon and extending laterally from the lure, a receptacle upon the holder spaced from the lure, and a fly trap removably contained within the receptacle.

2. A fly trap of the character described comprising a one piece base portion, a removable bait carrying receptacle in the base portion, a wire mesh body portion removably carried upon the base having a depending conically shaped fly entrance centrally thereof, a cover for said body portion, a central fly entrance therein, and means for separably uniting certain portions of the trap.

In testimony whereof I hereunto affix my signature in the presence of two witnesses.

CARL P. HASSELGREN.

Witnesses:
S. C. BRONSON,
S. GEO. STEVENS.